United States Patent
Yasuda et al.

(10) Patent No.: US 8,265,670 B2
(45) Date of Patent: Sep. 11, 2012

(54) COMMUNICATION APPARATUS AND METHOD OF DISPLAYING RECEIVED E-MAIL IN COMMUNICATION APPARATUS

(75) Inventors: Chikara Yasuda, Tokyo (JP); Masatoshi Tsubouchi, Tokyo (JP); Akemi Toyokura, Tokyo (JP)

(73) Assignee: Fujitsu Toshiba Mobile Communications Limited, Kawasaki (JP)

( * ) Notice: Subject to any disclaimer, the term of this patent is extended or adjusted under 35 U.S.C. 154(b) by 295 days.

(21) Appl. No.: 12/684,201

(22) Filed: Jan. 8, 2010

(65) Prior Publication Data
US 2010/0178946 A1    Jul. 15, 2010

(30) Foreign Application Priority Data
Jan. 14, 2009   (JP) ................ P2009-006109

(51) Int. Cl.
*H04W 4/12* (2009.01)
(52) U.S. Cl. ........ 455/466; 455/412; 455/413; 455/414; 455/550; 455/426
(58) Field of Classification Search .......... 455/466, 455/412, 414–419, 413, 550, 425
See application file for complete search history.

(56) References Cited

U.S. PATENT DOCUMENTS

2007/0090923 A1* 4/2007 Kraft et al. .................... 340/7.52
2008/0285729 A1* 11/2008 Glasgow et al. ........... 379/88.13

FOREIGN PATENT DOCUMENTS
JP          10-269154 A      10/1998
JP       2008-042698 A       2/2008

* cited by examiner

*Primary Examiner* — Kiet Doan
*Assistant Examiner* — Michael T Vu
(74) *Attorney, Agent, or Firm* — Maschoff Gilmore & Israelsen (57) ABSTRACT

A communication apparatus includes: an e-mail creating unit configured to create the e-mail with specifying an e-mail address of a destination; an e-mail transmitting/receiving unit configured to transmit/receive the e-mail; a display unit provided with a received mail display area for displaying received e-mail set if necessary and a created mail display area for displaying an e-mail being created; and a control unit configured to set the received mail display area and display the received e-mail if the e-mail is received during creating the e-mail and the e-mail address of a sender of the received e-mail matches with the e-mail address of the destination of the e-mail being created.

14 Claims, 10 Drawing Sheets

```
 ▌▊ ▭▭▭            14:00    ⟋23d
 NEW MAIL
 To   : A
 Title: Re:WITH REGARD TO      ⟋51
        WEEKEND PLANS
 ┌─────────────────────────┐
 │I'VE JUST ARRIVED AT MEETING│
 │PLACE                    │
 │ARE YOU HERE?            │
 └─────────────────────────┘
 RECEIVED MAIL
 From : A
 Title: WITH REGARD TO WEEKEND  ⟋23
        PLANS
 Date : 2008/11/08 19:35
 ┌─────────────────────────┐  ⟋53
 │MAY I SUGGEST MEETING AT │
 │14:00 AT SIBUYA STATION  │
 │I LOOK FORWARD TO SEEING YOU│
 └─────────────────────────┘
      23b      23a       23c
```

FIG. 6B

```
 ▌▊ ▭▭▭            14:00    ⟋23d
 NEW MAIL
 To   : A
 Title: Re:WITH REGARD TO      ⟋51
        WEEKEND PLANS
 ┌─────────────────────────┐
 │I'VE JUST ARRIVED AT MEETING│
 │PLACE                    │
 │ARE YOU HERE?            │
 └─────────────────────────┘
 RECEIVED MAIL
 From : A
 Title: NO TITLE               ⟋23
 Date : 2008/11/11 14:00
 ┌─────────────────────────┐  ⟋52
 │SORRY I'M LATE           │
 │I'LL REACH THERE 15 MINUTES│
 │LATER                    │
 └─────────────────────────┘
      23b      23a       23c
```

COMMUNICATION APPARATUS AND METHOD OF DISPLAYING RECEIVED E-MAIL IN COMMUNICATION APPARATUS

BACKGROUND OF THE INVENTION

1. Field of the Invention

The present invention relates to a communication apparatus having an e-mail transmitting/receiving function.

2. Related Art

In recent years, communication apparatuses equipped with an e-mail transmitting/receiving function such as a mobile phone have been widely used. Further, the communication apparatuses have been also used as a measure for performing real-time communications as well as voice communications. In such communication apparatuses, an e-mail may be received during creating of an e-mail.

Hitherto, there has been known a technique of utilizing a limited space of a display screen of a communication apparatus and informing a user of a message in a received mail.

For example, Japanese Unexamined Patent Application Publication No. 2008-42698 discloses a mobile phone unit capable of automatically displaying information to be displayed for informing a user of a message in an unread received mail without requiring a predetermined user's operation.

Further, Japanese Unexamined Patent Application Publication No, HEI 10-269154 discloses an incoming e-mail notification system capable of searching for a received mail based on preset conditions upon receiving an e-mail, and displaying necessary information while running a telop to determine detail information or the degree of importance if the conditions are matched.

The communication apparatus might receive an e-mail transmitted from a sender corresponding to a destination of an e-mail being created (created mail) during creation of the e-mail. For example, in the case of creating an e-mail in response to an e-mail A received from any sender, the communication apparatus might receive an e-mail B from the same sender. At this time, some users want to confirm a message of the e-mail B and reflect the message on a created mail if necessary before transmitting a reply to the e-mail A.

According to the techniques disclosed in Japanese Unexamined Patent Application. Publication Nos. 2008-42698 and HEI 10-269154, in the case of receiving an e-mail during operations including creation of an e-mail, a message of the received e-mail is displayed utilizing a scrolling (telop) function on a display screen such as a pictograph display area. However, an e-mail irrelevant to a created e-mail is also displayed on a display screen. A message of an e-mail unnecessary for a user is displayed as well. Further, even if a received e-mail is related to a created mail and is necessary for a user, its message is displayed on a limited display area such as a pictograph display area utilizing a scrolling (telop) function and notified to a user, which is inferior in visibility.

SUMMARY OF THE INVENTION

The present invention has been accomplished in view of such circumstances, and accordingly, it is an object of the present invention to provide a communication apparatus capable of reflecting necessary information in an e-mail received when an e-mail is being created, and efficiently creating an e-mail.

To attain the above object, a communication apparatus according to the present invention includes: an e-mail creating unit configured to create the e-mail with specifying an e-mail address of a destination; an e-mail transmitting/receiving unit configured to transmit/receive the e-mail; a display unit provided with a received mail display area for displaying a received e-mail set if necessary and a created mail display area for displaying an e-mail being created; and a control unit configured to set the received mail display area and display the received e-mail if the e-mail is received during creating the e-mail and the e-mail address of a sender of the received e-mail matches with the e-mail address of the destination of the e-mail being created.

Further, a communication apparatus according to the present invention includes: an e-mail creating unit configured to create the e-mail with specifying an e-mail address of a destination while quoting at least a part of a already received mail as the e-mail already received; en e-mail transmitting/receiving unit configured to transmit/receive the e-mail; a display unit configured to display the e-mail, being created; and a control unit configured to replace or add the already received mail quoted in the e-mail being created with or to the received e-mail if the e-mail is received during creating the e-mail and the e-mail address of a sender of the received e-mail matches with the e-mail address of the destination of the e-mail being created.

Further, A method of displaying a received e-mail in a communication apparatus according to the present invention includes: preparing a communication apparatus including an e-mail creating unit configured to create the e-mail with specifying an e-mail address of a destination, an e-mail transmitting/receiving unit configured to transmit/receive the e-mail, and a display unit provided with a received mail display area for displaying a received e-mail set if necessary and a created mail display area for displaying an e-mail being created; and setting the received mail display area and displaying the received e-mail if the e-mail is received during creating the e-mail and the e-mail address of a sender of the received e-mail matches with the e-mail address of the destination of the e-mail being created.

The communication apparatus and the method of displaying a received e-mail in the communication apparatus according to the present invention can reflect necessary information in an e-mail received when an e-mail is being created, and efficiently create an e-mail.

DESCRIPTION OF THE PREFERRED EMBODIMENTS

A communication apparatus according to an embodiment of the present invention will be described with reference to the accompanying drawings.

Figure 1A:
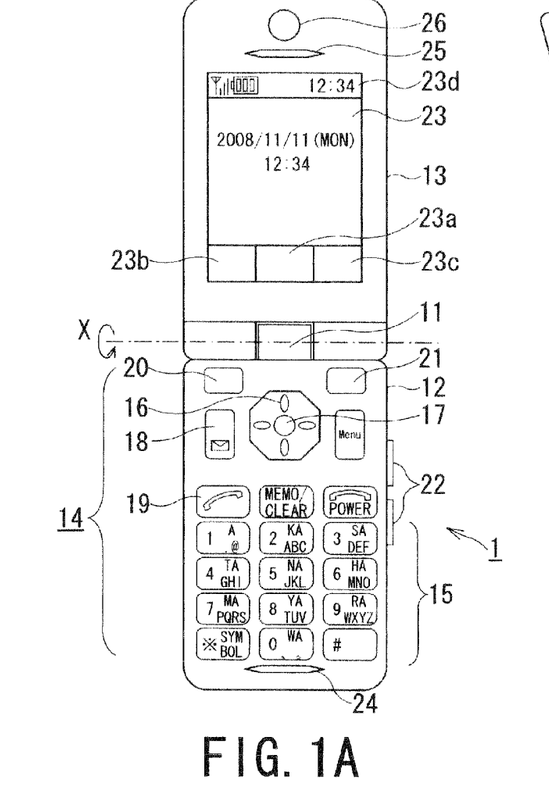
FIGS. 1A and 1B show an external configuration of a clamshell type mobile phone as an example of a communication apparatus according to the present invention.
Figure 1B:
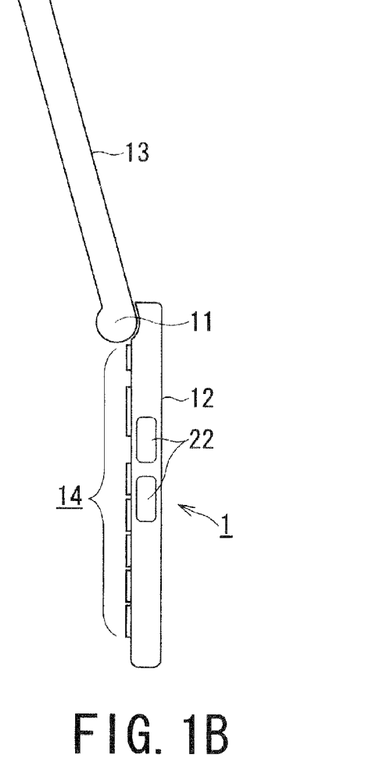

FIGS. 1A and 1B show an external configuration of a clamshell type mobile phone 1 as an example of a communication apparatus according to the present invention. FIG. 1A is a front view showing the external configuration of the mobile phone 1 that is opened at about 180 degrees, and FIG. 1B is a side view showing the external configuration of the opened mobile phone 1.

As shown in FIGS. 1A and 1B, in the mobile phone 1, a first casing 12 and a second casing 13 are hinge-coupled across a central hinge portion 11. The mobile phone 1 is foldable in the direction of the arrow X at the hinge portion 11. A transmitting/receiving antenna (antenna 31 in FIG. 3 as described later) is provided in a predetermined inner position of the mobile phone 1, and transmits/receives radio waves to/from a base station (not shown) through the incorporated antenna.

Operation keys 14 are arranged on the surface of the first casing 12. The operation keys 14 include, in particular, numerical keys 15 that can be used to input numbers "0" to "9", kana characters in "A" to "WA" rows, and alphabetical characters from "A" to "Z", an cross key 16 including up, down, left, and right keys, an enter key 17, a left soft key 20, a right soft key 21, and a mail key 18.

The cross key 16 is pressed in up, down, left, and right directions to thereby move a cursor displayed on a main display 23 in up, down, left, and right directions. Further, various kinds of processing are confirmed by pressing the enter key 17. The enter key 17 is also assigned with processing displayed on an enter key function display portion 23a provided below the main display 23.

Further, a left soft key 20 and a right soft key 21 are provided above the cross key 16 and the enter key 17 on the first casting 12. A side key 22 for operating the mobile phone 1 is provided on the side of the first casing 12. The left soft key 20, she right soft key 21, and the side key 22 are assigned with predetermined processing by being pressed inward of the first casing 12. In particular, the left soft key 20 and the right soft key 21 are assigned with processing displayed in a left soft key function display portion 23b and a right soft key function display portion 23c provided below the main display 23. The mail key 18 is assigned with processing for displaying a menu screen upon utilizing an e-mail function. In the case of utilizing the e-mail function, a user first presses down the mail key 18 to open a menu screen.

In the first casing 12, a microphone 24 is provided below the operation keys 14, and the microphone 24 collects user's voices during voice communications.

Here, a not-shown battery pack is inserted to the back side of the first casing 12. If an end/power key is pressed to power the mobile phone 1, a power is supplied to each circuit unit from the battery pack to make the mobile phone 1 operable.

On the other hand, the main display 23 is provided on a large part of the second casing 13. The main display 23 includes a pictograph zone 23d and the function display portions 23a, 23b, and 23c. The pictograph zone 23d displays an antenna pictograph indicating a current sensitivity level of an antenna, a battery pictograph indicating a current battery power of the mobile phone 1 and a current time. Here, the main display 23 is configured using, for example, an LCD (Liquid Crystal display), an organic EL (ElectroLuminescence) display, or an inorganic EL display. The main display 23 functions as a display unit.

A receiver 25 is provided in a predetermined position in an upper portion of the main display 23 of the second casing 13. A user can make a voice call using the receiver 25. A speaker (not shown) is also provided in a predetermined position of the mobile phone 1 as a voice output unit in addition to the receiver 25. Further, an internal CCD camera 26 is provided above the receiver 25 of the second casing 13 to thereby photograph a desired subject.

Figure 2A:
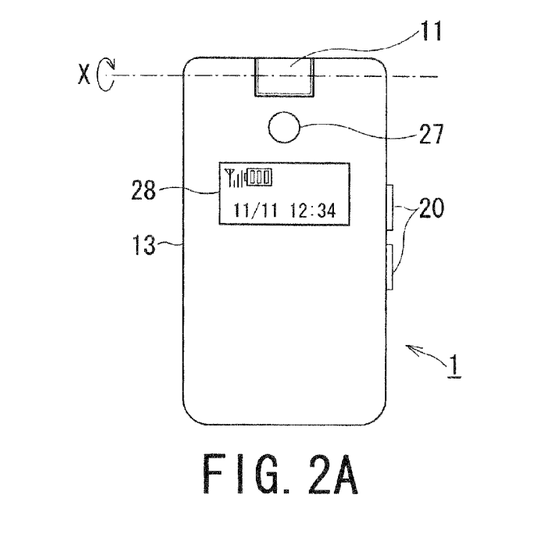
FIGS. 2A and 2B show another external configuration of a clamshell type mobile phone as an example of a communication apparatus according to the present invention.
Figure 2B:
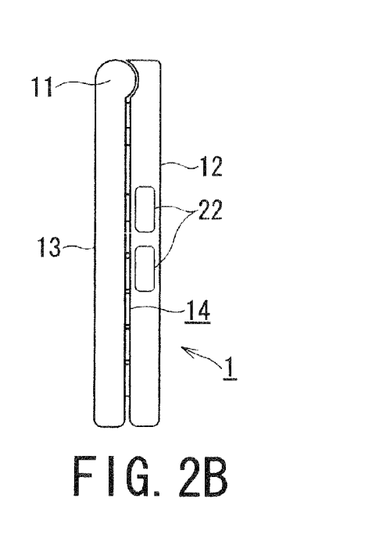

FIGS. 2A and 2B show another external configuration of the clamshell type mobile phone 1 as an example of a communication apparatus according to the present invention. In FIGS. 2A and 2B, the opened mobile phone 1 in FIGS. 1A and 1B is turned in the direction of the arrow X and then closed. FIG. 2A shows the external configuration of the closed mobile phone 1 as viewed from the front, and FIG. 2B shows the external configuration of the closed mobile phone 1 as viewed from the side.

An external CCD camera 27 is provided in an upper portion of the second casing 13 to thereby photograph a desired subject. A sub display 28 made up of, for example, an LCD is provided below the external CCD camera 27 and displays an antenna pictograph indicating a current sensitivity level of an antenna, a battery pictograph indicating a current battery power of the mobile phone 1, and a current time.

Figure 3:
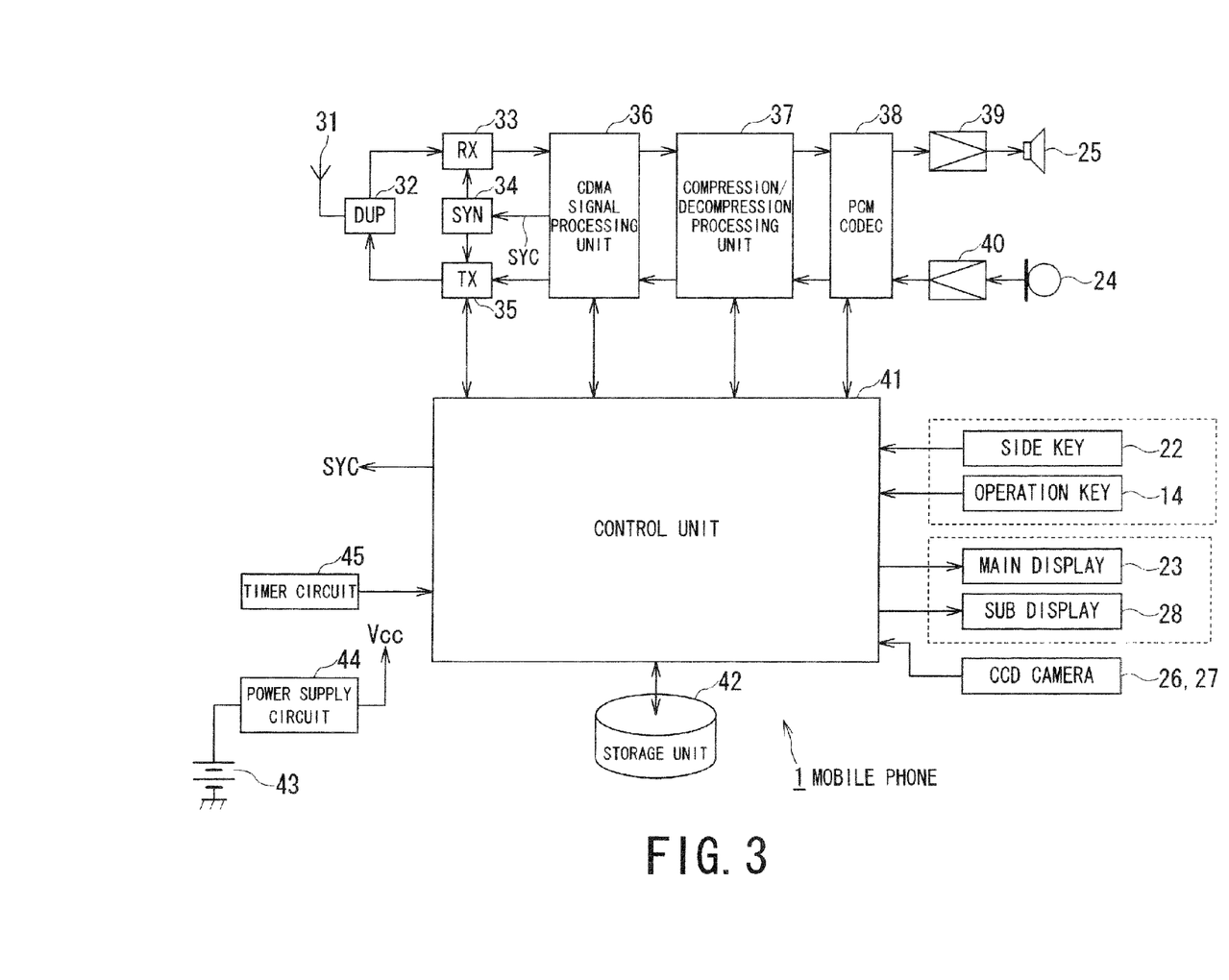
FIG. 3 shows an internal configuration of a mobile phone according to an embodiment of the present invention.

FIG. 3 is a diagram showing an internal arrangement of the mobile phone 1 of the embodiment. A radio signal transmitted from the base station is received by the antenna 31, passes through an antenna diplexer (DUP) 32 passes, and it input to a receiver (RX) 33. The receiver 33 may perform mixing of the received radio signal with a local oscillation signal output from a frequency synthesizer (SYN) 34 to down-convert the received radio signal into an intermediate frequency signal. Then, the receiver 33 generates a reception baseband signal by performing a quadrature (quadrature direction) on the down-converted intermediate frequency signal. The frequency of the local oscillation signal generated from the frequency synthesizer 34 is indicated by a control signal SYN output a control unit 41.

The reception baseband signal generated by the receiver 33 is input to a CDMA signal processing unit 36. The CDMA signal processing unit 36 is provided with a RAKE receiver (not shown). In the RAKE receiver, a plurality of paths included in the reception baseband signal are de-spread with respective spread codes (i.e., spread codes equivalent to those of spread reception signals). Then, after the phase in the despread signals of the respective paths in adjusted, the despread signals of the respective paths are coherent Rake combined by the RAKE receiver. A data train obtained through the RAKE combining is subjected to de-interleaving, channel decoding (error correction decoding), and binary data determination. Kith this operation, reception packet data having a predetermined transfer format can be obtained. The reception packet data is input to a compression/decompression processing unit 37.

The compression/decompression processing unit 37 is composed of a DSP (Digital Signal Processor). The compression/decompression processing unit 37 separates the reception packet data output from the CDMA signal processing unit 36 to respective media by a multiplexer/demultiplexer (not shown), and subjects the reception packet data of the separated media to a decoding process. For example, in a call mode, speech data included in the reception packet data and corresponding to spoken voile is decoded by a speech codec. If video data is including in the reception packet data, such as in case of a video phone mode, the video data is decoded by video codec. For example, if the reception packet data is download content, the download content is decompressed (expanded) and output to the control unit 41.

A digital speech signal obtained by decoding is supplied to a PCM codec 38. The PCM codec 38 PCM-decodes the digital signal output from the compression/decompression processing unit 37, and outputs an analog speech signal obtained by the PCM decoding to a receiving amplifier 39. The analog speech signal is amplified by the receiving amplifier 39 and output by the receiver 25.

A digital video signal obtained through decoding performed by a video codec of the compression/decompression processing unit 37 is input to the control unit 41. The control unit 41 causes the main display 21 to display a video image based on the digital video signal output from the compression/decompression processing unit 37 through a not shown video RAM (for example, VRAM and the like). The control unit 41 causes the main display 23 to display, via the RAM, not only a received video data but also a video data picked up by the CCD camera 26, 27 (the internal COD camera 26 and the external CCD camera 27).

If the reception data is an e-mail message, the compression/decompression processing unit 37 supplies the e-mail message to the control unit 41. The control unit 41 causes a storage unit 42 to store the e-mail message supplied from the compression/decompression processing unit 37. Then in response to the user's operation of the operation key 14, the control unit 41 reads the e-mail message stored in the storage unit 42 and causes the main display 23 to display the read e-mail message.

On the other hand, in the call mode, a speaker's (user's) speech signal (analog speech signal) input to the microphone 24 is amplified to a proper level by a transmitting amplifier 40 and PCM-coding by the PCM codec 38. A digital speech signal obtained by the PCM coding is input to the compression/decompression processing unit 37. A video signal output from the CCD camera 26, 27 is digitized by the control unit 41 and input to the compression/decompression processing unit 37. An e-mail message, which is text data generated by the control unit 41, is also input to the compression/decompression processing unit 37.

The compression/decompression processing unit 37 may compression-code the digital speech signal from the PCM codec 38 in a format corresponding to a predetermine transmission data rate. Thus, speech data is generated. Also, the compression/decompression processing unit 37 compression-codes the digital video signal from the control unit 41 so as to generate video data. Then, the compression/decompression processing unit 37 causes the multiplexer/demultiplexer to multiplex the speech data and the video data into transmission packet data in accordance with a predetermined transmission format. The compression/decompression processing unit 37 packetizes the data multiplexed in the multiplexer/demultiplexer. The compression/decompression processing unit 37 outputs the transmission packet data after the packetization to the CDMA signal processing unit 36. When an e-mail message is output from the control unit 41, the compression/decompression processing unit 37 similarly cause the multiplexer/demultiplexer to multiplex the e-mail message into transmission packet data.

The CDMA signal processing unit 36 uses a spread code assigned to a transmission channel to perform spread spectrum processing on the transmission packet data output from the compression/decompression processing unit 37, and outputs an output signal generated by the spread spectrum processing to a transmitter (TX) 35. The transmitter 35 modulates the signal after the spread spectrum processing by using a digital modulation method such as a QPSK (Quadrature Phase Shift Keying) method. The transmitter 35 synthesizes the transmission signal after the digital modulation with the local oscillation signal generated from the frequency synthesizer 34 to up-convert the transmission signal into the radio signal. Then, the transmitter 35 high-frequency-amplifies the radio signal generated by the up-conversion so as to obtain the transmission power level indicated by the control unit 41. The high-frequency-amplified radio signal, is supplied to the antenna 31 through the antenna diplexer 32 and transmitted to the base station from the antenna 31.

Further, the mobile phone 1 is provided with a timer circuit 45 indicating an exact current time and a predetermined time.

The control unit 41 includes, for example, a CPU (Central Processing Unit), a ROM (Read Only Memory), and a RAM (Random Access Memory). The CPU executes various kinds of processing in accordance with programs stored in the ROM or various application programs loaded from the storage unit 42 into the RAM. The CPU generates various control signals and supplies the generated control signals to the components in the mobile phone 1 to control the overall operation of the mobile phone 1. The RAM appropriately stores data necessary for the CPU to execute the various processing. Further, the control unit 41 also includes a video RAM that temporarily stores information about moving images displayed on the main display 23.

The storage unit 42 is, for example, a flash memory device, which is an electronically erasable and programmable read only memory, or an HUD. The storage unit 42 stores the various application programs executed by the CPU in the control unit 41 or various data groups. A power supply circuit 44 generates a predetermined operating power supply voltage Vcc based on a power of a battery 43 and supplies the voltage to each circuit portion.

The mobile phone 1 of this embodiment has an e-mail transmitting/receiving function. E-mail reception processing executed in the mobile phone 1 will be described herebelow.

Figure 4:
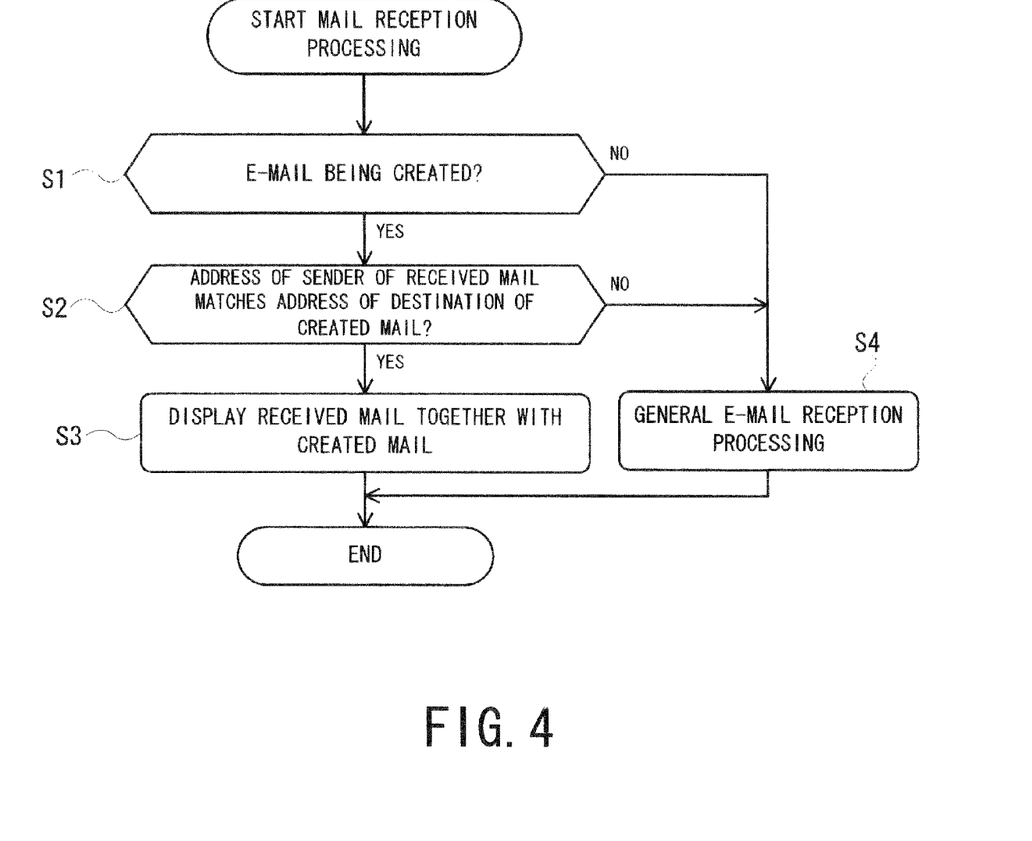
FIG. 4 is a flowchart of e-mail reception processing executed under control of a control unit of a mobile phone according to an embodiment of the present invention.

FIG. 4 is a flowchart showing an example of e-mail reception processing executed with the control unit 41 of the mobile phone 1 upon reception of an e-mail. This e-mail reception processing is started when the mobile phone 1 receives an e-mail.

In step S1, the control unit 41 determines whether an e-mail to be transmitted (created mail) such as a new mail or a reply mail is being created. The created mail is created while a character string input with the operation keys 14 is displayed on the created mail display area on the main display 23. At this time, the created mail display area is a display area other than the pictograph zone 23*d* and the function display portions 23*a*, 23*b*, and 23*c* on the main display 23.

If the control unit 41 determines that an e-mail is being created, in step S2, it is determines whether an e-mail address (address) of a sender of the received e-mail (received mail) matches with an address of a destination of the created mail. In the created mail is transmitted to plural addresses as a destination address, the control unit 41 determines whether an address of a sender matches with any one of the plural destination addresses. Further, the control unit 41 determines whether an address of a sender matches with addresses specified by "Cc:" (Carbon copy) and "Bcc:" (Blind carbon copy) in addition to an address specified by "To:".

If control unit 41 determines that an address of a sender of the received mail matches with an address of a destination of the created mail, in step S3, the control unit 41 displays a message of the received mail together with the created mail. The control unit 41 reduces the displayed created mail display area and newly displays a received mail display area to display the received mail.

On the other hand, it is determined that an e-mail is not being created in creation determination step S1 and that an address of a sender of the received mail does not match with an address of a destination of the created mail in address determination step S2, the control unit 41 executes general processing that is performed upon reception of an e-mail in step S4. For example, the control unit 41 performs processing for informing a user about an incoming mail by displaying a summary of a received e-mail like a title on the main display 23 or the sub display 28, displaying a received mail icon or pictograph indicating that an e-mail is received on the main display 23 or the sub display 28, and using ring alert or vibrations of a vibrator.

Figure 5A:
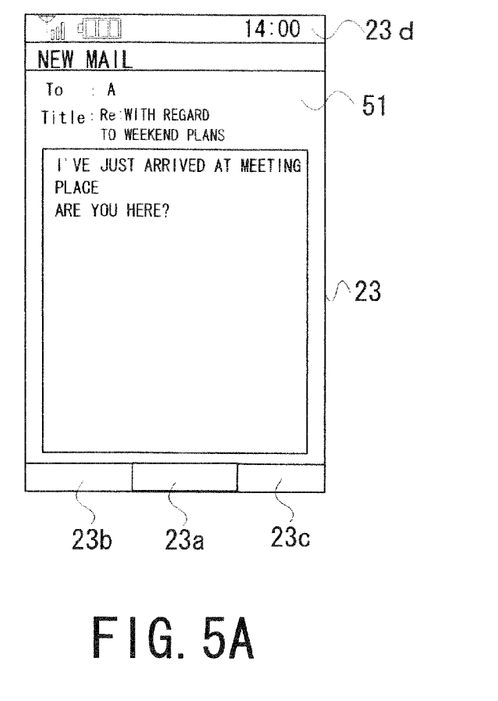
FIGS. 5A and 5B show a display example of a received mail upon creation of an e-mail on a mobile phone according to an embodiment of the present invention.
Figure 5B:
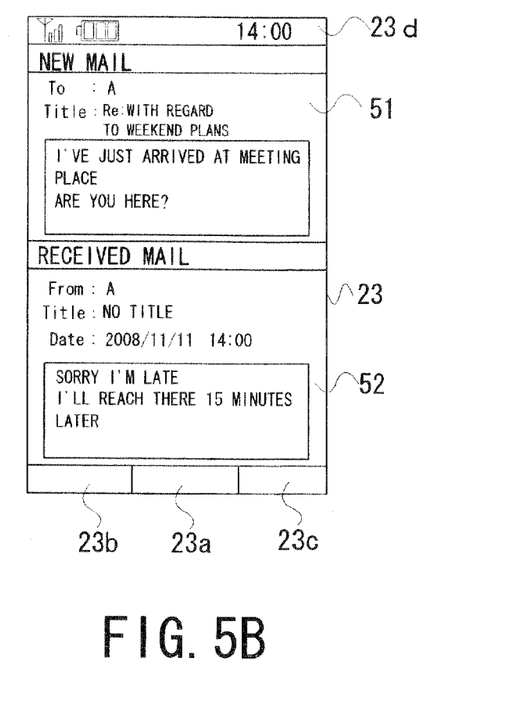

FIGS. 5A and 5B show a display example of a received mail upon creation of an e-mail on the mobile phone 1 of this embodiment. FIG. 5A shows a display example of the main display 23 upon general e-mail creation. FIG. 5B shows a display example on the main display 23 in the case of displaying a received mail during creation of an e-mail.

As shown in FIG. 5A, a user is creating an e-mail addressed to A. A created mail display area 51 accounts for a display area other than the pictograph zone 23*d* and function display portions 23*a*, 23*b*, and 23*c* on the main display 23. In this case, if an e-mail is received, and an address of a sender of the received mail matches with an address of a destination of the created mail, as shown in FIG. 5B, the control unit 41 reduces the created mail display area 51 and newly displays the received mail display area 52 to display the received mail. For example, as shown in FIG. 5B, the control unit 41 divides the display area functioning as the created mail display area 51 into two as the created mail display area 51 and the received mail display area 52 to thereby display the received mail.

Figure 6A:
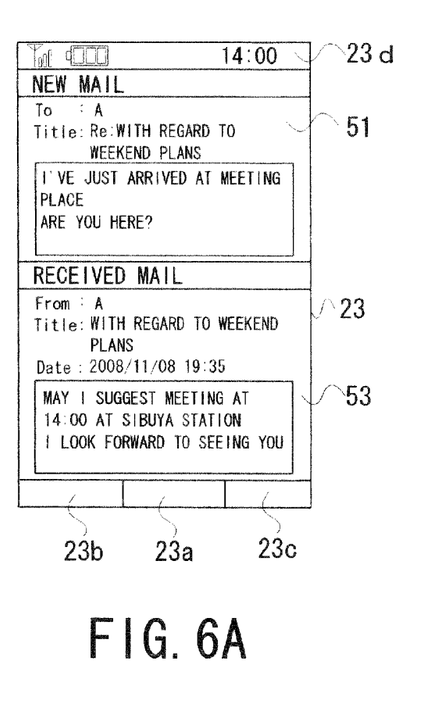
FIGS. 6A and 6B show another display example of a received mail upon creation of an e-mail on a mobile phone according to an embodiment of the present invention.
Figure 6B:
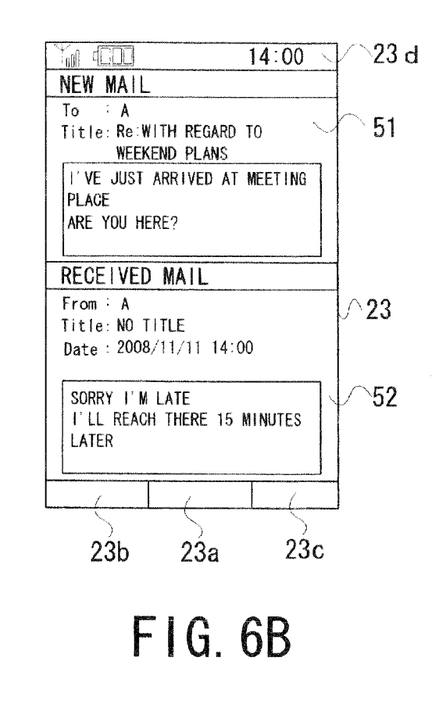

The mobile phone 1 may be configured to create e-mail while displaying at least one of mails already received (already received mails) FIGS. 6A and 6B show another display example of a received mail upon creation of an e-mail on the mobile phone 1 of this embodiment. FIG. 6A shows a display example of the main display 23 in the case of creating an e-mail while displaying an already received mail. FIG. 6B shows a display example on the main display 23 in the case of displaying a received mail during creation of an e-mail.

As shown in FIG. 6A, the mobile phone 1 displays an already received mail display area 53 on the main display 23 to thereby create an e-mail while displaying an already received mail. Thus, a user can smoothly create an e-mail in response to the already received mail. At this time, if an e-mail is received, and an address of a sender of the received e-mail matches with an address of a destination of the created mail, as shown in FIG. 6B, the control unit 41 changes the already received mail display area 53 on the main display 23 to the above received mail display area 52. In this way, the received mail can be displayed.

Here, in the case where the received mail is displayed on the received mail display area 52 in the main display 23, plural e-mails might be received, and any address of senders of the received mails might match with an address of a destination of the created mail. The following description is given of an example where the latest one of the received e-mails is displayed on the received mail display area 52 with the mobile phone 1 of this embodiment.

Figure 7A:
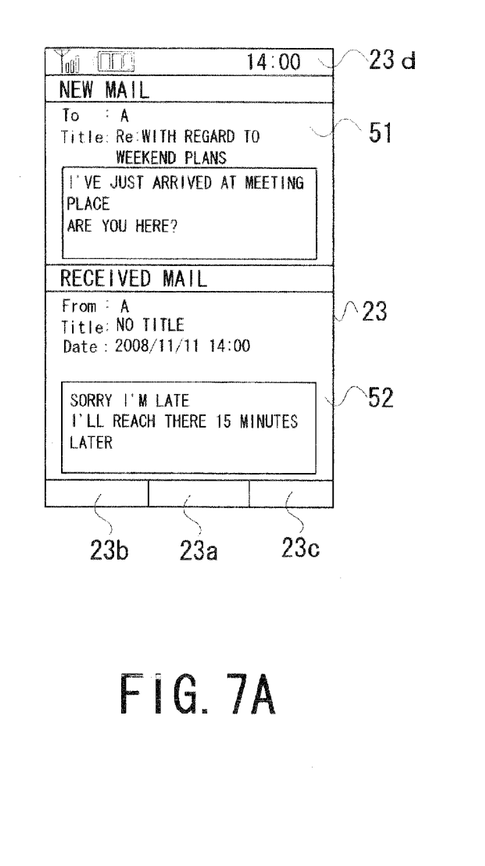
FIGS. 7A and 7B show a display example of a received mail in the case of receiving plural mails upon creation of an e-mail on a mobile phone according to an embodiment of the present invention.
Figure 7B:
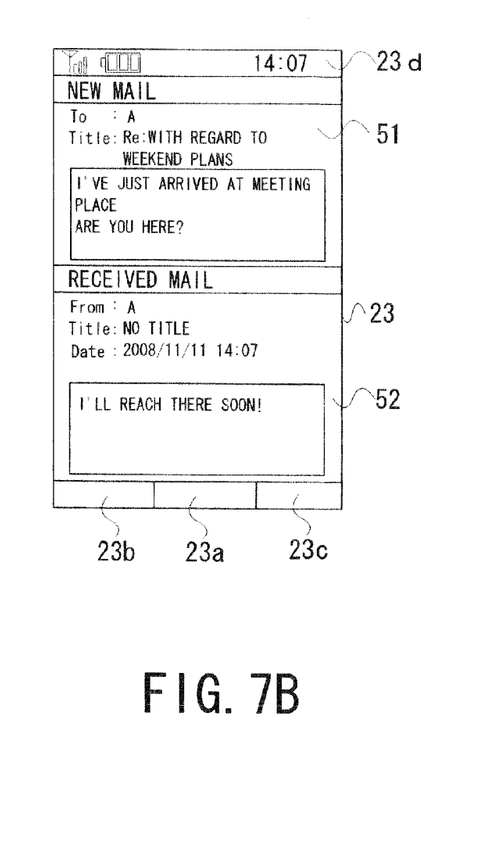

FIGS. 7A and 7B show a display example of a received mail in the case of receiving plural mails during creation of an e-mail in the mobile phone 1 of this embodiment. FIG. 7A shows a display example on the main display 23 in the case of displaying a received mail during creation of an e-mail. FIG. 7B shows a display example on the main display 23 in the case of additionally displaying another received mail during creation of an e-mail.

As shown in FIG. 7A, the main display 23 includes the created mail display area 51 and the received mail display area 52. In this case, if plural e-mails are received, and any address of senders of the received mails matches with an address of a destination of the created mail, as shown in FIG. 7B, the control unit 41 displays an additional received e-mail in place of a current e-mail being displayed on the received mail display area 52.

In the illustrated examples of FIGS. 7A and 7B, the latest one of the received e-mails is displayed on the received mail display area 52. Meanwhile, the received mails may be switchingly displayed on the received mail display area 52 at a predetermined time interval.

Figure 8A:
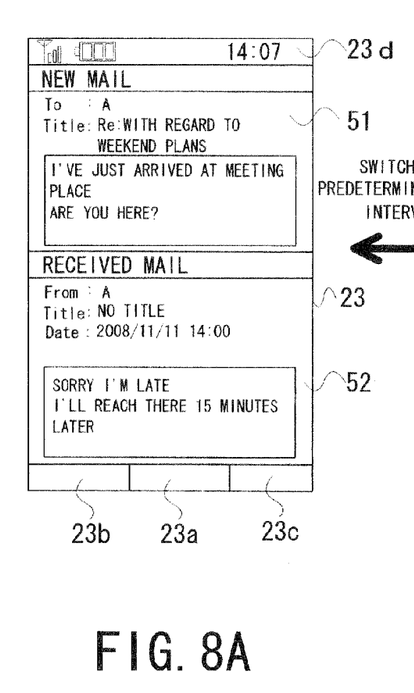
FIGS. 8A and 8B show another display example of a received mail in the case of receiving plural mails upon creation of an e-mail on a mobile phone according to an embodiment of the present invention.
Figure 8B:
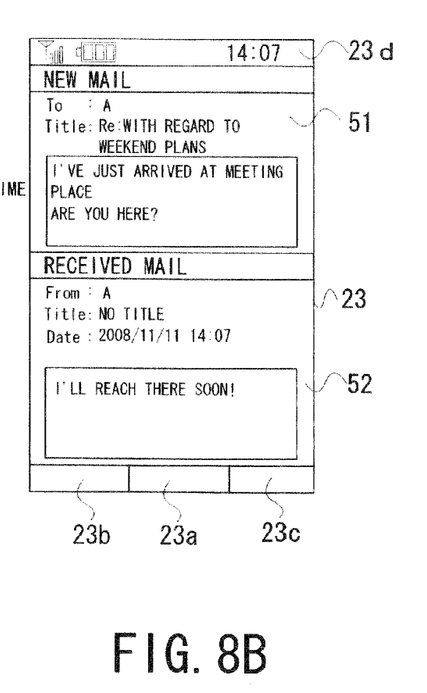

FIGS. 8A and 8B show another display example of a received mail in the case of receiving plural mails during creation of an e-mail in the mobile phone 1 of this embodiment. FIG. 8A shows a display example on the main display 23 in the case of displaying a received mail during creation of an e-mail. FIG. 8B shows a display example on the main display 23 in the case of additionally displaying another received mail upon creation of an e-mail.

As shown in FIG. 8A, the received mail display area 52 of the main display 23 displays one received mail. At this time, if plural e-mails are received, and any address of senders of the received mails matches with an address of a destination of a created mail, as shown in FIG. 8B, the control unit 41 switchingly displays the received mails on the received mail display area 52 at a predetermined time interval (for example, every 5 seconds).

By accepting an input operation with the predetermined operation key 14, received mails may be switchingly displayed on the received mail display area 52 at a predetermined time interval.

Figure 9A:
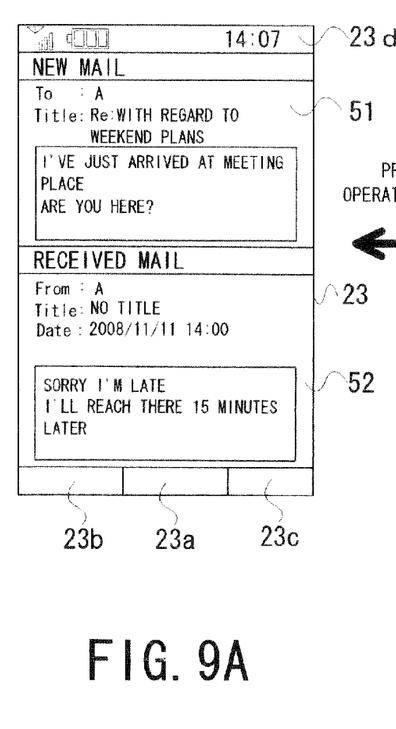
FIGS. 9A and 9B show still another display example of a received mail in the case of receiving plural mails upon creation of an e-mail on a mobile phone according to an embodiment of the present invention.
Figure 9B:
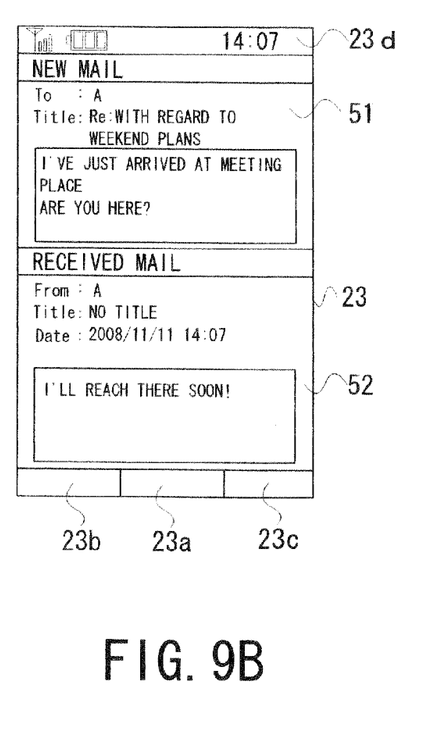

FIGS. 9A and 9B show still another example of a received mail in the case of receiving plural mails upon creation of an e-mail in the mobile phone 1 of this embodiment. FIG. 9A shows a display example on the main display 23 in the case of displaying a received mail during creation of an e-mail. FIG. 9B shows a display example on the main display 23 in the case of additionally displaying still another received mail upon creation of an e-mail.

As shown in FIG. 9A, the received mail display area 52 of the main display 23 displays one received mail. At this time, if plural e-mails are received, and any address of senders of the received mails matches with an address of a destination of a created mail, as shown in FIG. 9B, the control unit 41 switchingly displays the received mails on the received mail display area 52 by accepting an input operation with the predetermined operation key 14. The predetermined operation key 14 may be any key that can accept an input of an instruction to switch received mails; for example, the soft keys 20 and 21 may be used.

The mobile phone 1 of this embodiment displays the received mail display area 52 on the main display 23 if an address of a sender of the received mail matches with an address of a destination of the created mail to thereby confirm a message of the received mail and efficiently create an e-mail.

On the other hand, even if an e-mail is being created with the already received mail being partially quoted at least therein, when an address of a sender of the received mail matches with an address of a destination of the already received mail quoted in the e-mail being created or an address of a sender of the received mail matches with an e-mail address of a destination of the created mail, an e-mail may be created while reflecting a message of the received mail.

Figure 10:
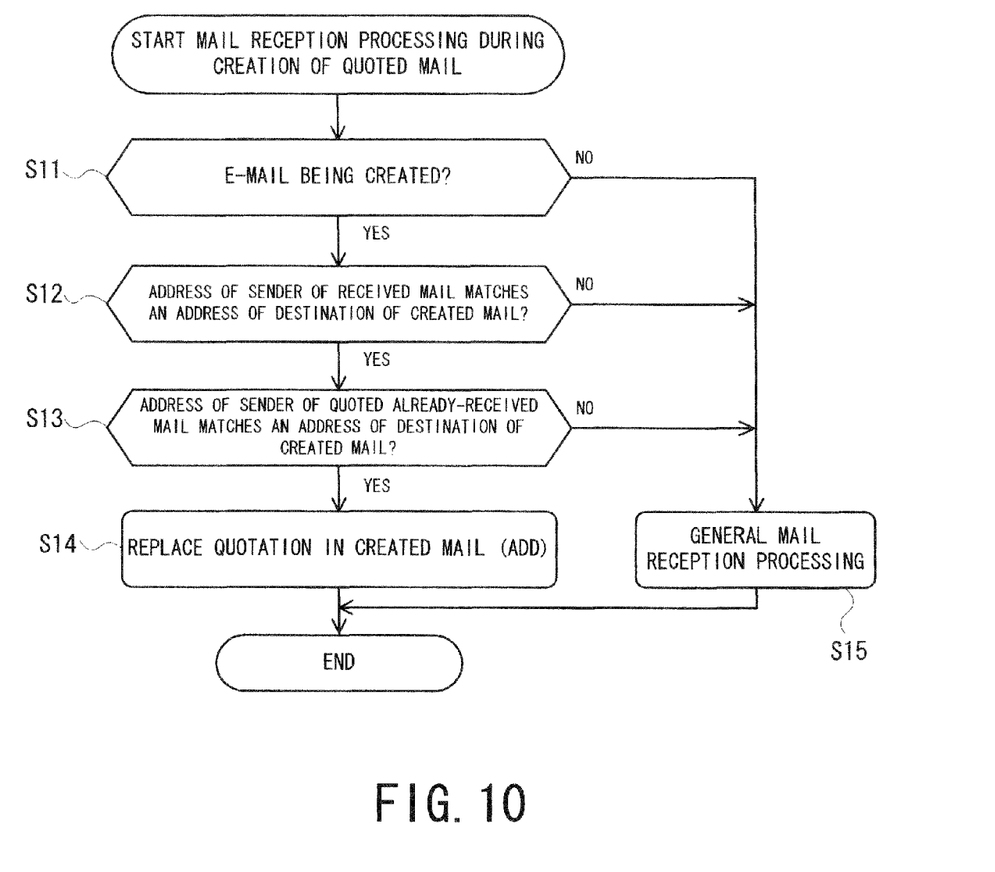
FIG. 10 is a flowchart of e-mail reception processing executed during creation of a quoted mail under control of a control unit of a mobile phone according to an embodiment of the present invention.

FIG. 10 is a flowchart of mail reception processing executed by the control unit 41 of the mobile phone 1 of this embodiment during creation of a quoted mail. Here, the same processes as the mail reception processing in FIG. 4 are omitted.

In step S11, the control unit 41 determines whether an e-mail quoting at least a part of the already received mail (for example, a part of a text message) (quoted mail) is being created. Address determination step S12 executed if it is determined that the quoted mail is being created is substantially similar to address determination step S2 of the e-mail reception processing in FIG. 4 and thus not described.

In address determination step S12, if it is determined that an address of a sender of the received mail matches with an address of a destination of the e-mail being created, in step S13, it is determined whether an address of a sender of the quoted already-received mail matches with an address of a destination of the created mail. If it is determined that an address of a sender of the quoted already-received mail matches with an address of a destination of the created mail, in step S14, the control unit 41 replaces the already received mail quoted in the created mail with the received mail. Alternatively, the control unit 41 adds the received mail to the quoted already-received mail.

On the other hand, if it is determined that the quoted mail is not being created in creation determination step S11, in the case where an address of a sender of each of the received mail and the quoted already-received mail does not match with an address of a destination of the created mail in address determination steps S12 and S13, the control unit 41 executes general processing that is performed upon reception of an e-mail in step S15. At this point, the mail reception processing executed upon creation of a quoted mail is completed.

Figure 11A:
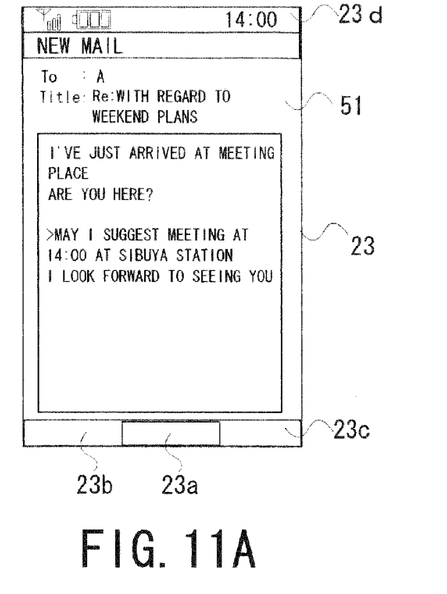
FIGS. 11A to 11C show a display example of a received mail upon creation of a quoted mail on a mobile phone according to an embodiment of the present invention.
Figure 11B:
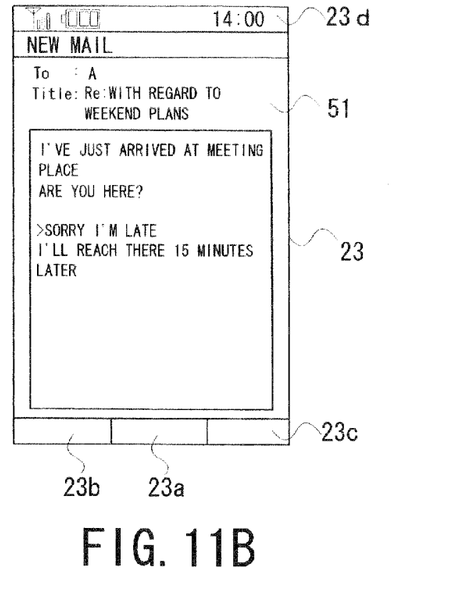
Figure 11C:
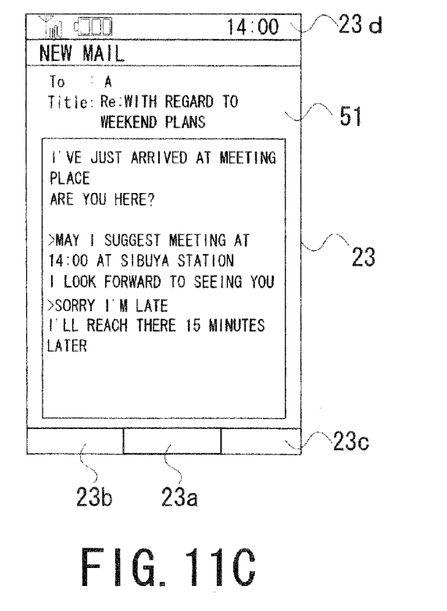

FIGS. 11A to 11C show a display example of a received mail during creation of a quoted mail in the mobile phone 1 of this embodiment. FIG. 11A shows a display example on the main display 23 upon general creation of a quoted mail. FIGS. 11B and 11C show a display example on the main display 23 in the case of displaying a received mail during creation of a quoted e-mail.

As shown in FIG. 11A, a user is creating a mail while quoting a text message of a received mail that has been already received from A. At this time, if an e-mail is received, and an address of a sender of each of the received mail and the quoted already-received mail matches with an address of a destination of the created mail, as shown in FIG. 11B, the control unit 41 replaces the text message of the quoted already-received mail by a new message of a received mail. Alternatively, as shown in FIG. 11C the control unit 41 adds a new message of a received mail to the text message of the quoted already-received mail.

Here, the control unit 41 determines that an address of a sender of the received mail matches with an address destination of the created mail in address determination step S12 upon mail reception processing, and in addition, an address of a sender of the quoted already-received mail matches with an address of a destination of the created mail in the address determination step S13. However, either one of the destination steps may be executed.

According to this mobile phone 1, in the case of receiving an e-mail during creation of an e-mail, an e-mail can be efficiently created while reflecting necessary information in the received e-mail. In other words, even during creation of an e-mail, if an e-mail is received from a sender matching a destination of the created mail, a description of the received mail can be checked. Thus, a message of the received mail can be reflected to the created mail as required. Hence, a user can be prevented from transmitting/receiving an inappropriate e-mail that has crossed in the mail.

On the other hand, as for the received mail displayed during creation of an e-mail, only an e-mail transmitted from a user as a destination of the created mail is displayed, which is effective in that a display area for creating an e-mail is not unnecessarily reduced.

Further, an e-mail can be efficiently created in that a quoted mail can be also created while reflecting a message of the received mail.

Further, even if plural e-mails sent from the same user as a destination of the created mail are received, the e-mails are automatically or manually switched and displayed to keep visibility.

The mobile phone 1 of the above embodiment can be used alone or in combination within the scope that produces advantages of the present invention.

The present invention is applicable to a PDA (Personal Digital Assistant), a personal computer, a portable game machine, a portable music player, a portable video player, and other such communication apparatus provided with an e-mail function in addition to the mobile phone.

Moreover, a series of processing described in each embodiment of the present invention can be executed using hardware as well as software.

Moreover, although this embodiment describes an example of the processes executed on the time series in the order of description, the processes include processes executed in parallel or separately, not executed on the time series.

What is claimed is:

1. A communication apparatus comprising:
   an e-mail creating unit configured to create the e-mail with specifying an e-mail address of a destination;
   an e-mail transmitting/receiving unit configured to transmit/receive the e-mail;
   a display unit provided with a received mail display area for displaying a received e-mail set if necessary and a created mail display area for displaying an e-mail being created; and
   a control unit configured to set the received mail display area and display the received e-mail if the e-mail is received during creating the e-mail and the e-mail address of a sender of the received e-mail matches with the e-mail address of the destination of the e-mail being created,
   wherein the control unit displays one received e-mail among a plurality of the received e-mails on the received mail display area if the e-mail address of the sender of a plurality of the received e-mails matches with the e-mail address of the destination of the e-mail being created in the case where the plurality of e-mails are received during creating the e-mail, and wherein the control unit displays one received e-mail among the plurality of received e-mails on the received mail display area by switching the received e-mail at a predetermine time interval.

2. The communication apparatus according to claim 1, wherein the control unit displays the latest received e-mail among the plurality of the received e-mails on the received mail display area.

3. The communication apparatus according to claim 1, wherein the control unit displays one received e-mail among the plurality of the received e-mails on the received mail display area by switching the received e-mail on the basis of a accepted predetermined input operation.

4. The communication apparatus according to claim 1, wherein:

the displaying unit provided with a already received mail display area for displaying at least one e-mail selected from already received e-mails with the created mail display area during creating the e-mail; and the control unit sets the received e-mail display area in place of the already received mail display area and displays the received e-mail if the e-mail address of the sender of the received e-mails matches with the e-mail address of the destination of the e-mail being created.

5. The communication apparatus according to claim 1, wherein the e-mail address of the destination of the e-mail being created includes the e-mail address specified by Cc and Bcc.

6. The communication apparatus according to claim 1, wherein the communication apparatus is a mobile phone.

7. A communication apparatus comprising:

an e-mail creating unit configured to create the e-mail with specifying an e-mail address of a destination while quoting at least a part of a already received mail as the email already received;

an e-mail transmitting/receiving unit configured to transmit/receive the e-mail;

a display unit configured to display the e-mail being created; and a control unit configured to replace or add the already received mail quoted in the e-mail being created with or to the received e-mail if the e-mail is received during creating the e-mail and the e-mail address of a sender of the received e-mail matches with the e-mail address of the destination of the e-mail being created, wherein the control unit replaces the already received e-mail quoted in the e-mail being created with the received e-mail or adds the received e-mail to the already received e-mail quoted in the e-mail being created if the e-mail address of a sender of the received e-mail matches with the e-mail address of the destination of the e-mail being created, and wherein the control unit displays one received e-mail among the plurality of received e-mails on the received mail display area by switching the received e-mail at a predetermine time interval.

8. The communication apparatus according to claim 7, wherein the communication apparatus is a mobile phone.

9. A method of displaying a received e-mail in a communication apparatus, comprising:

preparing a communication apparatus including an e-mail creating unit configured to create the e-mail with specifying an e-mail address of a destination, an e-mail transmitting/receiving unit configured to transmit/receive the e-mail, and a display unit provided with a received mail display area for displaying a received e-mail set if necessary and a created mail display area for displaying an e-mail being created; and setting the received mail display area and displaying the received e-mail if the e-mail is received during creating the e-mail and the e-mail address of a sender of the received email matches with the e-mail address of the destination of the e-mail being created, wherein the step displaying comprises: displaying one received e-mail among a plurality of the received e-mails on the received mail display area if the e-mail address of the sender of a plurality of the received e-mails matches with the e-mail address of the destination of the e-mail being created in the case where the plurality of emails are received during creating the e-mail, and wherein the control unit displays one received e-mail among the plurality of received e-mails on the received mail display area by switching the received e-mail at a predetermine time interval.

10. The method of claim 9, wherein the step of displaying comprises: displaying the latest e-mail among the plurality of the received e-mails on the received mail display area.

11. The method of claim 9, wherein the step of displaying comprises: displaying one received e-mail among the plurality of received e-mails on the received mail display area by switching the received e-mail at a predetermine time interval.

12. The method of claim 9, wherein the step of displaying comprises: displaying one received e-mail among the plurality of the received e-mails on the received mail display area by switching the received e-mail on the basis of a accepted predetermined input operation.

13. The communication apparatus according to claim 9, wherein:

the displaying unit provided with a already received mail display area for displaying at least one e-mail selected from already received e-mails with the created mail display area during creating the e-mail; and the step of setting and displaying comprises: setting the received e-mail display area in place of the already received mail display area and displaying the received e-mail if the email address of the sender of the received e-mails matches with the e-mail address of the destination of the e-mail being created.

14. The method of claim 9, wherein the e-mail address of the destination of the e-mail being created includes the e-mail address specified by Cc and Bcc.

* * * * *